Nov. 10, 1959  C. K. STILLWAGON  2,912,218
VALVE
Filed Feb. 11, 1955  4 Sheets-Sheet 1

CRAWFORD K. STILLWAGON
INVENTOR.

BY
Browning, Simms & Hyer
ATTORNEYS.

Nov. 10, 1959 C. K. STILLWAGON 2,912,218
VALVE
Filed Feb. 11, 1955 4 Sheets-Sheet 2

CRAWFORD K. STILLWAGON
INVENTOR.

BY
Browning, Simms + Hyer
ATTORNEYS.

Nov. 10, 1959   C. K. STILLWAGON   2,912,218
VALVE

Filed Feb. 11, 1955   4 Sheets-Sheet 3

CRAWFORD K. STILLWAGON
INVENTOR.

BY
Browning, Simms & Hyer
ATTORNEYS.

Nov. 10, 1959 C. K. STILLWAGON 2,912,218
VALVE

Filed Feb. 11, 1955 4 Sheets-Sheet 4

CRAWFORD K. STILLWAGON
INVENTOR.

BY
Browning, Simms & Hyer
ATTORNEYS.

United States Patent Office 2,912,218
Patented Nov. 10, 1959

2,912,218

VALVE

Crawford K. Stillwagon, Houston, Tex.

Application February 11, 1955, Serial No. 487,588

7 Claims. (Cl. 251—306)

This invention relates to valves and more particularly to valves of the type known as disc or butterfly valves.

In disc valves of the type employing a resilient member for a valve seat which also seals between two parts of the valve body, the bore through the resilient member is unsupported when the valve is open. When on suction service, the pressure differential across the seal element will tend to reduce the diameter of the bore through the element constricting flow and under a large differential the seat may permit leakage or may collapse and pull out of its socket entirely.

In valves of the type referred to, the combined valve seat and seal may occasionally permit leakage through the seams of the valve body before the end of the useful life of the element as a valve seat.

An object of this invention is to provide a valve having a minimum number of parts each of which may be easily and inexpensively fabricated.

Another object is to provide a valve of the type referred to above in which the valve seat is protected from exterior pressure to prevent large differentials developing across the seat when the valve is used in suction service.

Another object is to provide a valve of the type referred to in which the valve seat is provided with an anchor intermediate its ends to hold the seat in its socket.

Another object is to provide a valve of the type referred to in which the valve seat is both provided with an anchor intermediate its ends and protected from exterior pressure so that the seat will remain in its socket when the valve is in suction service.

Another object is to provide a valve of the type referred to in which the seat element is anchored in the body at both of its ends and at an intermediate point.

Another object is to provide a valve of the type referred to above in which the valve body is formed in two parts and a double seal is provided against passage of fluid between the two parts.

Another object is to provide a valve of the type referred to in which a special seal about the valve stem is not necessary.

Another object is to provide a two-piece valve body in which the two pieces are identical except for their means for coupling the valve in a line, which may or may not differ, so that the two halves of the body will be interchangeable and an inventory of half body parts of a weld end, flange end, and threaded end style are all that is necessary to assemble a valve with any desired combination of coupling means.

Another object is to provide a valve of the type referred to in which the valve body is formed in two parts and a double seal against leakage between the two parts is provided by the valve seat and anchor for the seat, respectively.

Another object is to provide a valve of the type referred to with a one-piece stem.

Another object is to provide a resilient seal element for use in a valve of the type referred to with a concentric portion spaced radially outwardly from the seat to act as an anchor for the seat and provide an auxiliary seal.

Other objects, features and advantages of this invention will appear from time to time or will be apparent to one skilled in the art from a consideration of the specification, claims and attached drawings.

In the drawings wherein there is shown by way of illustration one embodiment of this invention and wherein like reference numerals indicate like parts:

Figure 1:
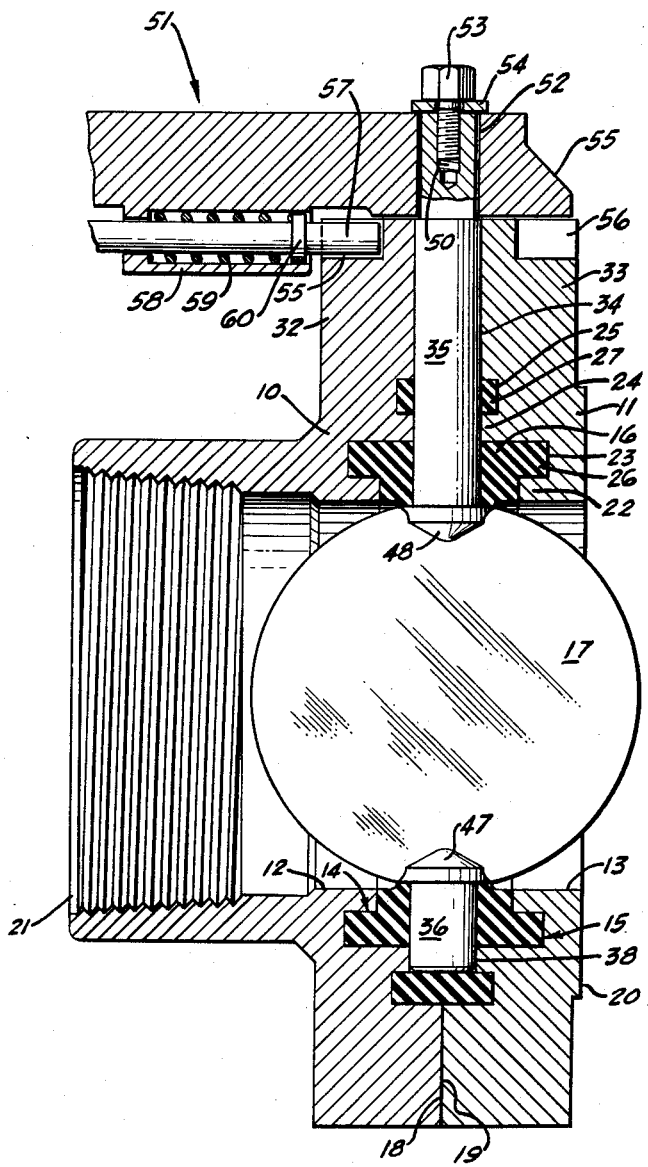
Fig. 1 is a view in cross section through a valve embodying this invention with only a portion of the actuator handle being shown.

The valve body is formed of two parts 10 and 11 which are provided with registering bores 12 and 13, respectively, which form a flow passageway through the body. Body parts 10 and 11 have confronting recesses, indicated generally at 14 and 15, which together form a socket in which there is positioned a resilient element 16 which seals between the two body parts and provides a valve seat. A valve disc 17 is mounted for cooperation with seat 16 to control flow through the valve.

The valve body is divided into parts 10 and 11 along a plane extending across the flow passageway and preferably at an angle normal to the flow passageway. The radially outer portions of the opposed surfaces of the body parts 10 and 11 provide abutment faces 18 and 19, respectively, which are identical and thus the body parts may be interchanged with each other and there are no left and right-hand side body parts. Body part 11 is provided with an abutment face 20 which is adapted to abut a conventional flange fitting with a gasket therebetween to connect the valve into a flow line. Body part 10 is provided with a threaded fitting 21 for purposes of connecting the valve in a flow line. Dissimilar end fittings 20 and 21 were selected to illustrate various ways of connecting the valve body into a flow line. Inasmuch as the two body parts are freely interchangeable, two body parts 10 might be connected together to provide a valve which would make up with threaded ends in a conduit. Likewise, two parts 11 might be selected to permit the valve to be made up between flange fittings. It is pointed out that with a valve made up of two body parts 11 it is not necessary to disturb the conduit to remove the valve, it only being necessary that bolts between the flange fittings be removed and the valve may be lifted laterally out of the flow line. The end fittings might also include weld ends for welding the valve in a flow line.

Recesses 14 and 15 in body parts 10 and 11, respectively, provide radially inner portions of the opposed surfaces of these body parts which are spaced apart to form an annular recess in the assembled body. The body surfaces within these recesses adjacent the portions of the bodies which actually abut each other, form the outermost walls, or outer extremities, of the recesses. The recesses are preferably formed with a system of identical opposing but spaced apart lands and grooves to anchor seal element 16 in the socket with the seal element sealing against passage of fluid between the two pieces of the body. The recesses extend circumferentially around the passageway through the body and open into the passageway at their inner extremities so that the element 16 will be exposed to the passageway and function as a valve seat. The locus of the opening of the recesses into the passageway through the valve may also be termed the innermost extremities of the recesses. Beginning at the passageway and proceeding radially outwardly therefrom, each recess is provided with a land 22 extending outwardly from the inner extremity of the recess, then a groove 23, a second land 24, and then a second groove 25. The outer or radially inwardly facing walls of grooves 25 join each other and form the outermost wall or extremity of the recesses. The axial distance between lands 22 is such as to provide the necessary axial space for a valve seat. Grooves 23 are spaced apart a greater distance than lands 22 so as to provide undercut surfaces in the body to receive endwise flange portions 26 of the seal element to anchor the ends of the seal element in the socket. The bottoms of grooves 25 are likewise spaced apart a distance greater than the distance between lands 24 so as to provide undercut surfaces for receiving an anchoring portion 27 of the seal element. Lands 24 are somewhat closer together than lands 22 and cooperate with anchor 27 to anchor the intermediate portion of seal 16 in the body. Lands 24 are spaced radially outwardly from the innermost extremities of the recesses by grooves 23 and lands 22, and radially inwardly from the outermost walls of the recesses by the grooves 25. With this arrangement, seal 16 is anchored at both ends and at an intermediate point and there is no danger of the seal escaping from its socket. The lands and grooves 22 through 25 are concentric with the passageway through the body and extend circumferentially about the passageway to entirely surround the passageway. In other words, these lands and grooves are continuous and anchor the seal at all points about the bore through the seal. Identical concentric lands and grooves in each of body parts 10 and 11 are preferred as this permits easy assembly of the parts and seal element and permits interchanging the two body parts, thus reducing inventory.

The two body parts 10 and 11 are held in assembled relationship by studs 28 which are recessed in countersunk bores 29 and threadedly received in threaded bores 30 in body parts 10 and 11, respectively. For purposes of complete interchangeability of the two body parts, they may both initially be fabricated with threaded bores such as 30 and then when a pair of body parts are selected for assembly, one of the threaded bores may be bored out to form a countersunk bore 29.

Both body parts are provided with matching holes 31 which ring the body outboard of the seal socket and the two halves of the body are firmly secured together by bolts passing through these holes and through a flange in abutment with body part 11. In the event two threaded end fittings or weld end fittings are used, then bolts and nuts would be used to secure the two sections of the body together.

Body parts 10 and 11 are provided with radially extending neck parts 32 and 33, respectively, for receiving a valve stem associated with disc 17. Each of the body parts has formed therein one-half of a radially extending bore 34 for receiving valve stem 35. Bore 34 is formed one-half in each of the body parts and is bisected by abutment faces 18 and 19 so that the stem may be moved laterally into each of the half bores when the valve body is made up. A similar bore 38 is formed in lands 24 to receive a stub shaft 36 carried by the disc member on the opposite side from stem 35. Bores 34 and 38 are axially aligned and serve as bushings for the valve stem and hold it in the desired position in the valve body.

The combination seat and seal member 16 is a tubular member formed of resilient material such as neoprene, rubber, hycar or other synthetics with a durometer value of about 60 having been found to be very satisfactory. While a 60 durometer material is relatively hard, it is sufficiently soft to function as a seal and seat, and may be used with this type of valve inasmuch as it is not necessary to distort the seal in placing it in its socket. The tubular seal element 16 will be seen to comprise two annular radially spaced concentric portions 37 and 27 joined together by an annular web 39. The inner annular portion 37 has a bore 40 extending therethrough of substantially equal diameter with bores 12 and 13 through the valve and when assembled in the valve bore 40 forms a portion of the flow passageway through the body and serves as a valve seat. Portion 37 is provided with identical endwise extending flange portions 26 which are adapted to be received in the undercuts formed by lands and grooves 22 and 23 in the body elements to anchor the ends of the seal element in the valve body. The radially outermost portion 27 serves as an anchor and is received in the undercut portions of the body formed by lands 24 and grooves 25 to anchor the intermediate portion of the seal to the body. When unassembled, the axial dimension of the seal element, that is, the distance between the endwise faces of the seal element, is slightly greater than the distance between the respective confronting lands and grooves in abutment faces 18 and 19. The radial dimensions of the several components of the seal element should be approximately the same as the radial dimensions of the various lands and grooves in the body so that the seal element will readily slide into the lands and grooves of the body parts but will tend to space the body parts apart. Thus, as the body parts 10 and 11 are pulled into engagement with each other, the seal element will be placed under compression and will seal against loss of fluid through the seam between the two body parts. The bore 40 through the seal element should be slightly less in diameter than the bores 13 and 14 so that a disc of the diameter of the bores 13 and 14 may be employed with the seal element, it being understood that the seal element should have a bore of slightly lesser diameter than the diameter of the disc which cooperates therewith to control flow of fluid through the valve.

The seal element is also provided with opposed bores 42 and 43 of a slightly lesser diameter than the diameter of the valve stem 35 and opposed stub shaft 36 which are received in bores 42 and 43, respectively. Preferably, the axial dimension of anchor 27 is greater than the diameter of bore 42 so that anchor 27 will form an auxiliary seal about the stem 35 radially outward from the valve seat and in the event any fluid passes the seat portion 37 of the seal element such fluid will be trapped by anchoring portion 27 and prevented from escaping. This feature will permit the anchor 27 to act as a complete auxiliary seal about the seat and will ordinarily insure that the useful life of the seal as a seat element will be completely utilized before it is necessary to replace the seal. The seal is also supplied with opposed flats 44 and 45 which surround bores 42 and 43, respectively, and permit the use of a disc which is flattened out adjacent the valve stem and stub shaft.

From the above it will be seen that there has been provided a two-piece body and seal element in which axially spaced seals are provided between the two body parts to doubly protect against leakage of fluid through the seam in the body. The body and seal are provided with cooperating parts which anchor the seal in the body at both of its end and at an intermediate portion. The arrangement of the structure is such that when the valve is on suction service the seat portion 37 of the valve element is protected from the exterior pressure to prevent build-up of an excessive differential across the valve seat portion. This is true because the exterior pressure will be effective only against the radially outermost face of anchor 27. Anchor 27 is backed up over most of its area by lands 24 and hence the effect of pressure against the radially outermost face of anchor 27 which overlies lands 24 is not effective against the seat portion of the seal element. Exterior pressure is only effective against the seat portion of the seal element over an area defined by the space between lands 24. The effect of external pressure through web 39 is counteracted by the anchoring portion 38 being supported by lands 25. When the pressure against the bore 40 of the seal element is reduced while on suction service, the pressure on the radially outermost portion of seat 37 is correspondingly reduced and hence, no differential builds up across the seat portion 37 which would tend to collapse the seal other than that transmitted through web 39. That is, while the excess of pressure outside over that inside is taken by the seat element, the outside pressure is effective to collapse the seal only over the area of the web 39, and is sealed by this web portion and by the anchor 27 from further penetration into the interior of the valve. It follows that the only area of the seal over which the external high pressure and internal low pressure are opposed to each other is the cross-section area of the web 39. The differential over this area is all that would tend to collapse the seal. From the above it will be seen that the valve of this invention is one well adapted for use in suction service as there will be little if any tendency for the valve seat to collapse.

It will be appreciated that if web 39 were omitted and seat 41 and anchor 27 were two separate portions then the anchor 27 would completely protect the seat 41 against external pressure. However, it is desirable that these two seal elements be integral so that an anchor will be provided to firmly secure the intermediate portion of the seal in the valve body. Practically the same result as two separate seal elements is obtained by using a web having a small axial dimension.

Disc valve element 17 cooperates with bore 40 through the seal element 16 to control flow of fluid through the valve. The disc, stem 35, and stud shaft 36 are an integral unit. This integral unit is made possible by the two-piece valve construction and eliminates the possibility of leakage between the valve disc and stem. Disc 17 is formed on a diameter which is preferably approximately the same as the diameter of bores 12 and 13. As the diameter of bore 40 of the seal element is slightly less than this value, disc 17 will bite into the seat element as it is closed and form a complete seal therewith. The disc is flattened out adjacent its junctures with the stem 35 and stub shaft 36 and has flared out portions 47 and 48 at these points to provide flat faces for engagement with flats 44 and 45 of the seal element. This will prevent the disc from digging into the seal element immediately adjacent the stem and stub shaft during the entire arc of turning of the disc as would be necessary if these cooperating flat portions on the disc and seal element were not provided.

It will be noted from Fig. 1 that stub shaft 36 terminates short of the radially outermost portion of seal 16, that is, anchoring portion 27. Thus, the anchoring portion provides a complete seal outboard of the stub shaft which is not subject to wear due to rotation of the stub shaft.

Both stem 35 and stub shaft 36 are formed on a slightly smaller diameter than the bores 34 and 38 through the valve body but on a slightly larger diameter than the bores 42 and 43 through the seal element. The free end of stem 35 is provided with flats 49 about its periphery to form a wrench part and a central threaded bore 50 for securing an operating handle to the stem.

Any form of operating handle may be employed but the handle indicated generally at 51 is preferred as it permits easy one-handed operation of the valve disc. Handle 51 is elongated and provided at one end with a non-circular socket 52 which has flats corresponding to flats 49 on stem 35 to non-rotatably mount the handle on the stem. A stud 53 is used to fasten a washer 54 to the end of shaft 35, which washer has a diameter greater than the socket 52 of handle 51, thus securing the handle to the stem. The handle is provided with a pointer 55 which indicates the position of disc 17.

Figure 2:
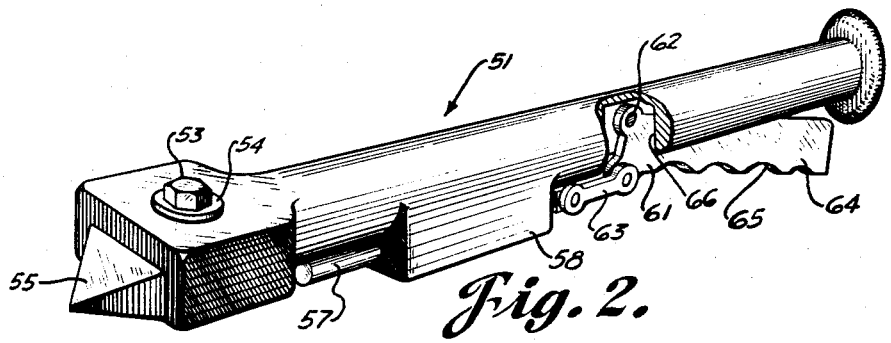
Fig. 2 is a perspective view of the actuator handle partially shown in Fig. 1 with parts broken away to illustrate details of the handle.
Figure 3:
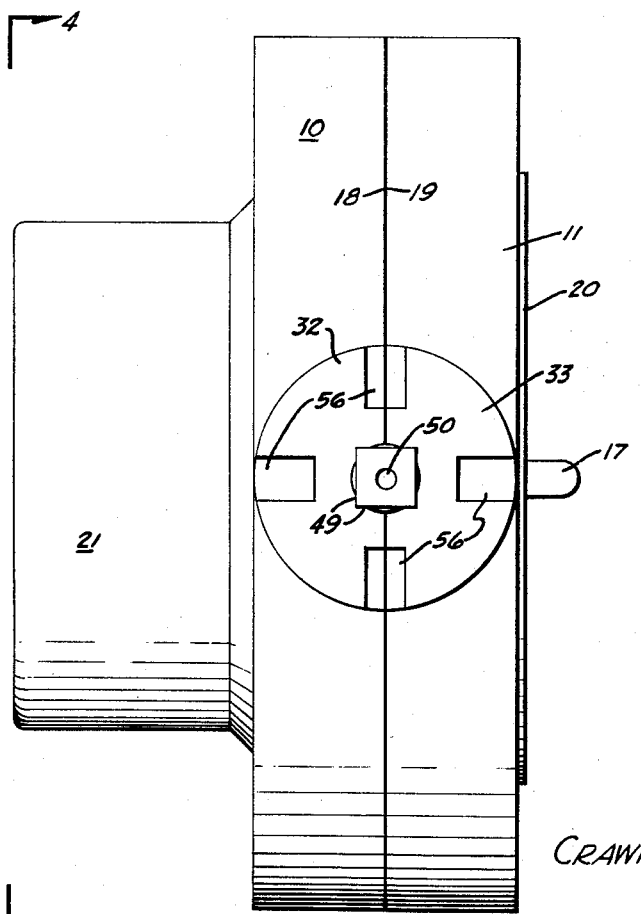
Fig. 3 is a plan view of the valve of Fig. 1 with the handle omitted.
Figure 5:
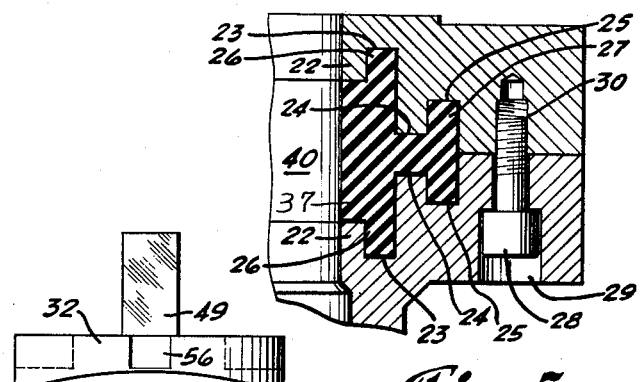
Fig. 5 is a fragmentary cross-sectional view taken along the lines 5—5 of Fig. 4.
Figure 4:
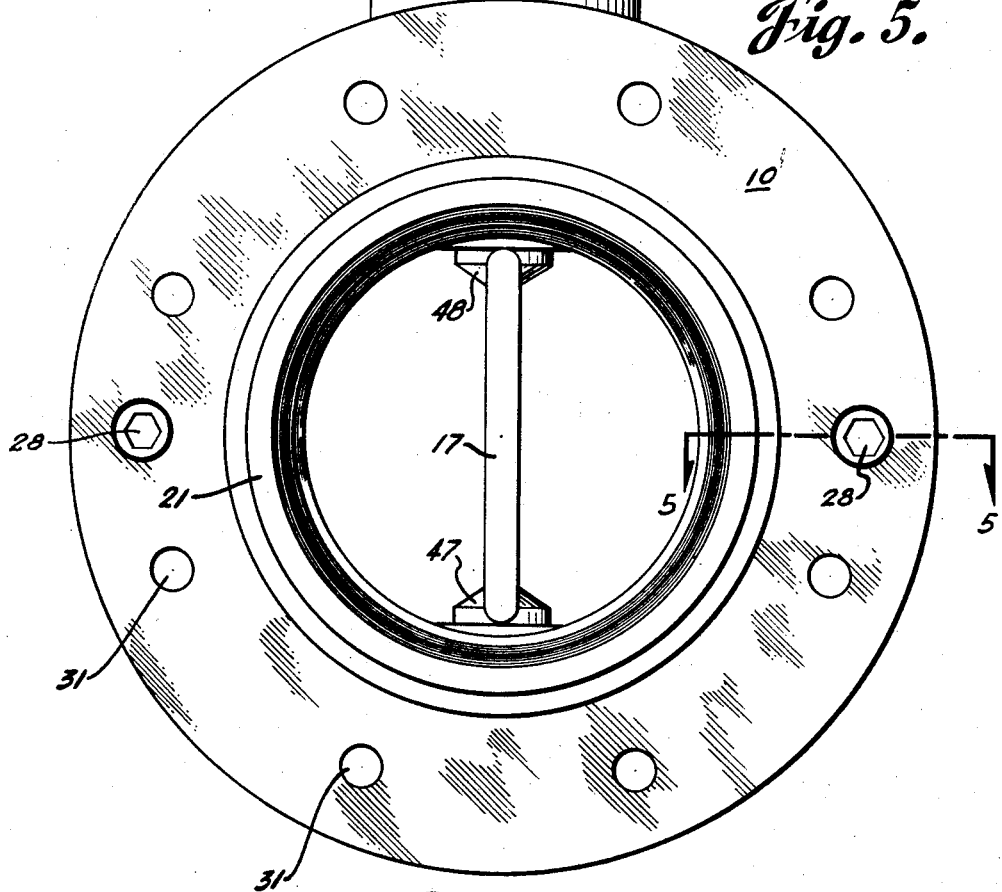
Fig. 4 is a view in end elevation of the valve taken along the lines 4—4 of Fig. 3.
Figure 8:
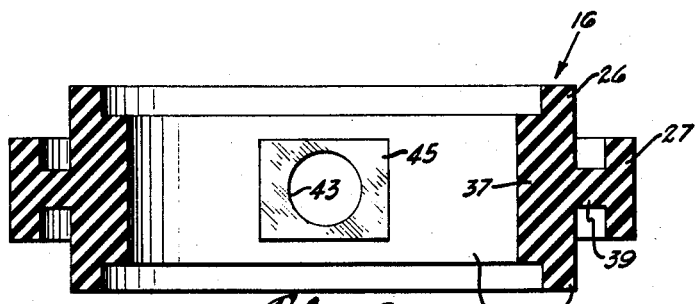
Fig. 8 is a view in cross section through the seat element taken along the lines 8—8 of Fig. 6.
Figure 6:
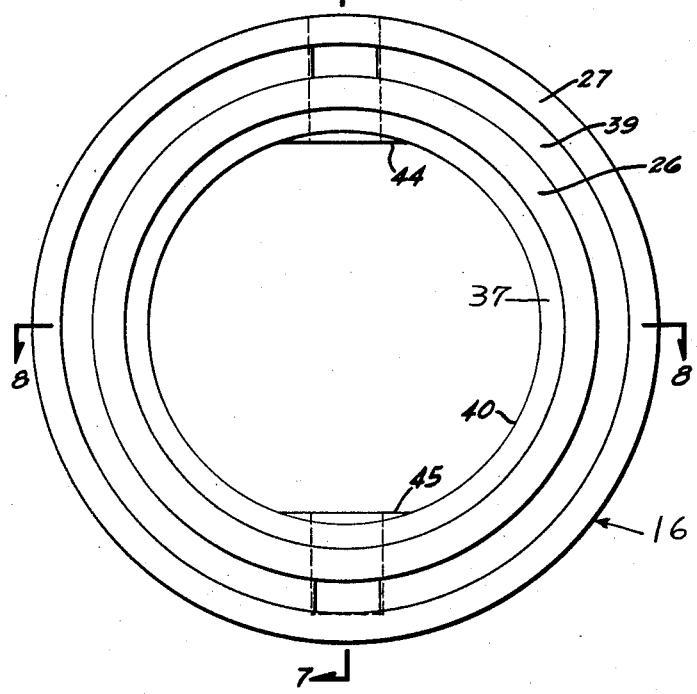
Fig. 6 is a view in end elevation of the resilient seal element of the valve.
Figure 7:
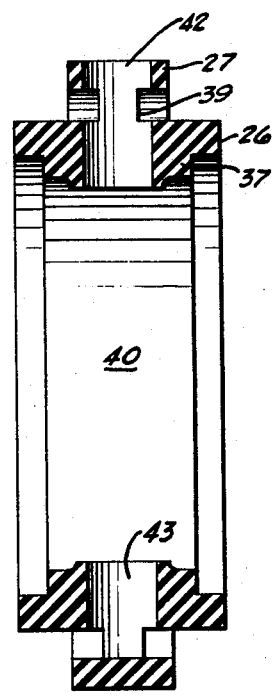
Fig. 7 is a view in cross section through the seal element taken along the lines 7—7 of Fig. 6.

While the disc may be used to regulate the amount of flow through the valve, its most common use will be to shut off flow through a line and thus in this service the disc will normally have two operative positions, that is, full open and full closed. In order to lock the disc in these two positions, the body parts 10 and 11 are provided with sockets 56, Fig. 3, at the top of upstanding necks 32 and 33. Sockets 56 are arranged about bore 34 at 90 degree intervals with two opposed sockets paralleling the flow passageway and two transverse of the passageway. The two transverse sockets are each formed one-half in neck portions 32 and 33 as best shown in Fig. 3. The handle 51 is provided with a plunger 57 which is reciprocal longitudinally of the handle to move from a position in which the free end of the plunger is received within one of sockets 56 and to a second position in which the plunger is completely withdrawn from such socket. Thus, plunger 57 will lock the valve disc in a desired position and may be released to permit changing the position of the valve disc. The plunger 57 is mounted in a cylindrical jacket 58 which has an open end facing the free end of the plunger. A resilient means such as a spring 59 is mounted in this jacket and bears against a stop 60 on the plunger to urge it towards extended position. A bell crank arm 61 is pivoted to the handle at 62 and to plunger 57 by a link 63. Crank 61 is provided with an actuator arm 64 which extends toward the free end of the handle from pivot 62. The mounting is such that the plunger will be seated in one of sockets 56 with actuator arm 64 extending toward the free end of handle 51 from pivot 62 and at a substantial angle therewith. When the arm is operated to rotate bell crank 61 about its pivot and retract plunger 57, the actuator arm 64 will be at a lesser angle with handle 51. Preferably, the arm 64 is scalloped along its bottom edge at 65 to present a better gripping surface. The dimensioning of the handle and operating arm is such that the plunger may be actuated by squeezing the actuator arm toward the handle by an operator grasping the handle and actuator arm in one hand and squeezing these two parts together. Preferably, the handle is slotted as at 66 and actuator arm 64 is recessed in slot 66 as shown in Fig. 2.

From the above description of the valve, it is believed apparent that the valve may be originally assembled or repaired in the field by unskilled labor as there is no fine adjustment of parts or packing, and the two parts of the body are completely interchangeable. It will also be noted that the seal may be reversed in the body, that is, the end faces of the seal are identical and thus its orientation when placed in the socket is not important.

The valve is assembled by first distorting the seal sufficient to insert the valve disc in the seal element. This is, of course, accomplished by first inserting stem 35 through bore 42 and then inserting stub shaft 36 into bore 43. The two halves of the body are then brought together about the seal and stem and held in assembled relationship by studs 28. This is all of the assembly necessary for the valve proper until it is made up within a flow line at which time the bolts utilized in flanging the valve in the flow line will additionally draw the two halves of the body more securely together as they ring the entire valve. Of course, when two weld end or threaded end fittings are used, then bolts may be utilized in holes 31 to complete make-up of the two body parts at the factory.

The handle is assembled by placing spring 59 about plunger 57, inserting the plunger and spring into cage 58, and then fastening the crank arm and link to the plunger. The handle is then secured to stem 35 utilizing bolt 53 and washer 54.

From the above it will be seen that all of the objectives of this invention have been accomplished. There has been provided a valve which has only two body parts, a single seal and an integral valve disc, stem and stub shaft. Thus, the valve is composed of only four parts and the means for assembling the two sections of the body together. A double seal has been provided which protects against possible loss of fluid through the seam in the body past the valve seat portion of the seal. There has also been provided endwise anchors for holding the ends of the valve seat in the body. A further anchor for the intermediate section of the seat has been provided which additionally seals between the body parts and protects the valve seat against external pressure to prevent build-up of large differentials across the valve seat when the valve is used in suction service.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A disc valve comprising, a body divided into two parts, said parts having registering bores to form a flow passageway through the body and abutment faces in engagement with each other, the abutment faces each being grooved adjacent the bores to provide an annular recess surrounding and opening into the passageway with rigid extensions of the body parts at the bores providing lands between the bores and the recess to provide a seal receiving socket surrounding the passageway, an annular resilient element in said socket sealing between the two parts of the body, anchoring means carried by and extending radially outward from the periphery of said element and disposed about the circumference thereof, means carried by at least one of the body parts in engagement with the anchoring means and resisting radially inward movement of the anchoring means about its circumference, said resilient element having a bore extending therethrough to form a part of the passageway through the body, and a disc mounted for cooperation with the bore through the seal element to control flow through the valve.

2. A disc valve comprising, a body divided into two parts, said parts having registering bores to form a flow passageway through the body and abutment faces in engagement with each other, first annular grooves in the abutment faces of the parts to provide a space between the abutment faces surrounding the flow passageway, rigid flange extensions of the parts forming lands between the bores and grooves, second annular grooves in the abutment faces, said second grooves spaced radially outward of and separated from the first grooves by flange extensions on the body parts and surrounding the passageway to provide a second space between the abutment faces surrounding the flow passageway, resilient seal means in the first annular grooves sealing between the abutment faces, anchoring means carried by the seal means and received in the second grooves to anchor the seal in the body, said seal means having a bore extending therethrough to form a part of the passageway through the body, and a disc mounted for cooperation with the bore through the seal means to control flow through the valve.

3. A disc valve comprising, a body divided into two opposed body parts, said parts having registering bores to form a flow passageway through the body and abutment faces in engagement with each other, an annular recess in each abutment face, said recesses surrounding and opening into the passageway to provide a space between the opposed body parts surrounding the flow passageway, said recesses having their interiors formed with opposed circumferentially extended lands formed on the body parts and spaced radially inwardly from the outermost walls of the recesses and spaced radially outwardly from the innermost extremities of the recesses and surrounding the passageway to form annular undercut anchoring portions in the recesses, an annular resilient seal element held between the two parts of the body, said seal element shaped to conform to and completely fill said recesses whereby the lands will anchor the seal element in the body, said seal element having a bore extending therethrough to form a part of the passageway through the body, and a disc mounted for cooperation with the bore through the seal element to control flow through the valve.

4. A disc valve comprising, a body divided into two opposed body parts, said parts having registering bores to form a flow passageway through the body and abutment faces in engagement wtih each other, an annular recess in each abutment face, said recesses surrounding and opening into the passageway to provide a space between the opposed body parts surrounding the flow passageway, said recesses having their interiors formed with opposed circumferentially extending radially spaced opposed lands formed on the body parts and positioned respectively in positions spaced from the inner and outer extremities of and adjacent the inner extremity of each of the two recesses and surrounding the passageway to form annular undercut anchoring portions in the recesses, the distance between the radially outermost opposed lands of the two body parts being much less than the distance between the bottoms of the recesses radially outwardly of said outermost lands, an annular resilient seal element held between the two parts of the body, said seal element shaped to conform to and completely fill said recesses whereby the lands will anchor the seal element in the body, said seal element having a bore extending therethrough to form a part of the passageway through the body, and a disc mounted for cooperation with the bore through the seal element to control flow through the valve.

5. A disc valve comprising, a body divided into two opposed body parts, said parts having registering bores to form a flow passageway through the body and abutment faces in engagement with each other, an annular recess in each abutment face, said recesses surrounding and opening into the passageway to provide a space between the opposed body parts surrounding the flow passageway, said recesses having their interiors formed with opposed circumferentially extending lands formed on the body parts and spaced radially inwardly from the outermost walls of the recesses and spaced radially outwardly from the innermost extremities of the recesses and surrounding the passageway to form annular undercut anchoring portions in the recesses, an annular resilient seal element held between the two parts of the body, said seal element shaped to conform to and completely fill said recesses whereby the lands will anchor the seal element in the body, said seal element having a bore extending therethrough to form a part of the passageway through the body, and a valve disc formed integral with a stem and stub shaft on opposite sides of the disc, said disc mounted for cooperation with the bore through the seal element to control flow through the valve, said stem extending to the exterior of the body through the seal element to seal against loss of fluid about the stem, said stub shaft terminating short of the radially outermost portion of the seal.

6. A disc valve comprising, a body comprised of a plurality of body pieces having a flow passageway therethrough, the body pieces having their opposed surfaces abutting each other along radially outer portions and spaced from each other along radially inner portions to provide an annular recess in the body surrounding the passageway, a tubular resilient seal element in the recess, said element having radially spaced relatively thick annular portions joined by a relatively thin web, said recess having annular lands formed as integral portions of the body pieces and spaced radially inwardly from the outermost walls of said recesses and in abutment with the web of the seal element whereby the radially outermost portion of the seal element will anchor the seal in the body, and a disc mounted for cooperation with the bore through the seal element to control flow through the valve.

7. As a subcombination, a tubular resilient valve seat element having radially spaced inner and outer concentric portions joined by a web having a lesser axial dimension than the axial dimension of the outer portion of the seal element said inner portion being of greater axial extent than the outer and said seal element having a radially extending opening for accommodating a valve stem.

References Cited in the file of this patent

UNITED STATES PATENTS

| | | |
|---|---|---|
| 508,765 | Rouse | Nov. 14, 1893 |
| 1,004,388 | Dickert | Sept. 26, 1911 |
| 1,977,351 | Phillips | Oct. 16, 1934 |
| 2,022,395 | White | Nov. 26, 1935 |
| 2,339,666 | Anderson | Jan. 18, 1944 |

FOREIGN PATENTS

| | | |
|---|---|---|
| 670,327 | Germany | of 1939 |